(12) United States Patent  
Lau (10) Patent No.: US 7,340,690 B2  
(45) Date of Patent: Mar. 4, 2008

(54) SPACE-EFFICIENT LINEAR HIERARCHICAL VIEW AND NAVIGATION

(75) Inventor: Shelley Lau, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 10/886,918

(22) Filed: Jul. 8, 2004

(65) Prior Publication Data

US 2006/0010399 A1    Jan. 12, 2006

(51) Int. Cl.
  *G06F 3/00*    (2006.01)
(52) U.S. Cl. ...................... 715/855; 715/853
(58) Field of Classification Search ............... 715/853, 715/840, 841, 854, 855; 707/101, 102, 205
  See application file for complete search history.

(56) References Cited

U.S. PATENT DOCUMENTS

| | | |
|---|---|---|
| 6,199,199 B1 | 3/2001 | Johnston et al. |
| 6,278,452 B1 | 8/2001 | Huberman et al. |
| 6,348,935 B1 | 2/2002 | Malacinski et al. |
| 6,990,638 B2 * | 1/2006 | Barksdale et al. .......... 715/853 |
| 2002/0154177 A1 * | 10/2002 | Barksdale et al. .......... 345/853 |

* cited by examiner

*Primary Examiner*—Ba Huynh  
*Assistant Examiner*—Kim-Lynn Dam  
(74) *Attorney, Agent, or Firm*—Jeanine Ray-Yarletts, Esq; Steven M. Greenberg, Esq.; Carey Rodriguez Greenberg & Paul LLP (57) ABSTRACT

There is disclosed a method and system for presenting hierarchical objects in a linear view, in which each open container object is split into a pair of bracketing ends, the bracketing ends brackering therebetween any lower level objects contained in the container object. A multi-level hierarchical arrangement of container objects may be represented by multiple pairs of such bracketing ends arranged in a nested configuration. Both bracketing ends of each pair may be configured with a navigation control to close a corresponding container object. The linear hierarchical view may be placed in either a horizontal orientation or a vertical orientation, depending on the nature of the data. A visual characteristic may be used to identify and distinguish between hierarchical levels within the linear hierarchical view. To make more efficient use of available screen space, container objects in the linear hierarchical view may be dynamically collapsible.

21 Claims, 5 Drawing Sheets

SPACE-EFFICIENT LINEAR HIERARCHICAL VIEW AND NAVIGATION

BACKGROUND

The present invention relates generally to user interfaces for computer systems, and more particularly to a method and system for providing space-efficient hierarchical views and navigation in a graphical user interface (GUI) environment.

Figure 2:
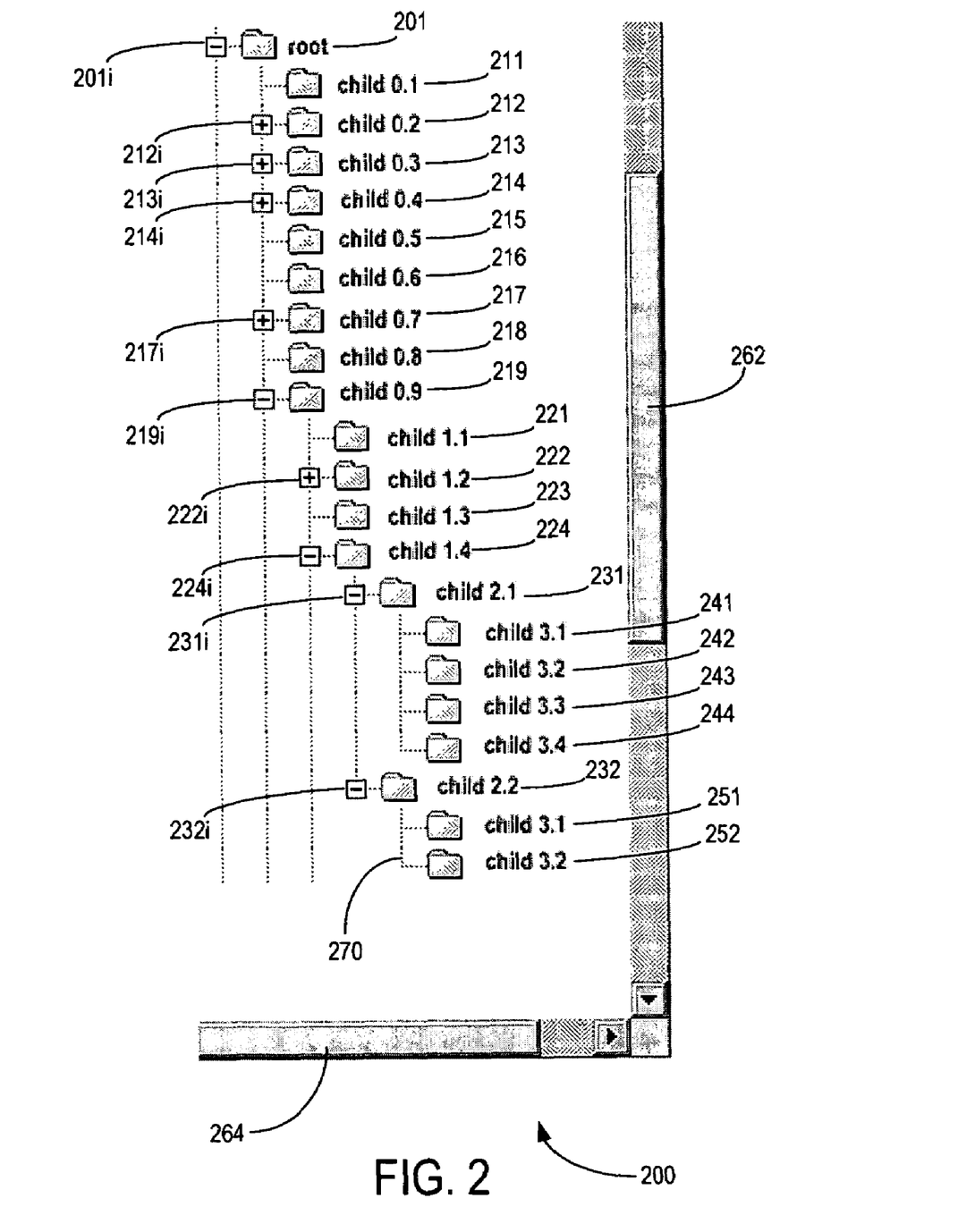
FIG. 2 is an illustrative conventional tree view of folder objects in a data directory.

Tree views are often used in modern GUI operating systems and application programs to represent hierarchical relationships between objects, and to allow a user to navigate and access those objects. As illustrated in FIG. 2, a tree view may be used to represent a directory structure using "folder" icons arranged in a conventional manner, with lower level folders appearing below and indented to the right of corresponding higher level folders. As shown in FIG. 2, connecting lines may also be used to explicitly show the hierarchical relationships. Also, an indicator box may be positioned to the left of a folder to indicate that the folder is currently open (e.g. using the "−" sign), or closed (e.g. using the "+" sign).

While generally functional, the conventional tree view of FIG. 2 has some limitations. In particular, for a more complex hierarchical structure having many levels, the conventional tree view may quickly expand vertically and horizontally to exceed available screen space. In order to navigate such an expanded tree view, it may become necessary to scroll extensively back and forth and sideways, in a GUI panel. As well, the conventional tree view may not be suitable for displaying certain types of hierarchical relationships between objects.

What is needed is a technique for providing a more space-efficient hierarchical view with straightforward navigation.

SUMMARY OF THE INVENTION

The present invention provides a method and system for presenting hierarchical objects in a linear view, in which each open container object is split into a pair of bracketing ends, the bracketing ends bracketing therebetween any lower level objects contained in the container object. A multi-level hierarchical arrangement of container objects may be represented by multiple pairs of such bracketing ends arranged in a nested configuration. In an embodiment, both bracketing ends of each pair may be configured with a navigation control to close a corresponding container object. The linear hierarchical view may be placed in either a horizontal orientation or a vertical orientation, depending on the nature of the data.

To make more efficient use of available screen space, container objects in the linear hierarchical view may be dynamically collapsible such that only the contents of the lowest level container object are viewable. A toggle control may be used to toggle between this collapsed view, and an alternate view in which the contents of all opened container objects are displayed.

A visual characteristic may be used to identify and distinguish between hierarchical levels within the linear hierarchical view. For example, a pair of bracketing ends representing an open container object may have a matching color, shade, shape, size or some other visual characteristic. Objects representing the contents of the open container may have other colors, shades, shape, size or some other visual characteristic, such that the levels are readily distinguished. The range of colors, shades, shapes or sizes used for the linear hierarchical view may be generated in dependence upon the number of levels.

In an aspect of the invention, there is provided a computer system-implemented method of displaying a plurality of hierarchical objects in a graphical user interface (GUI), the plurality of hierarchical objects including at least one container object, each container object for containing a lower level hierarchical object, the computer system-implemented method comprising: (i) determining whether a particular container object is open or closed; (ii) if the particular container object is open, then displaying the particular container object as a pair of bracketing ends, the bracketing ends containing therebetween contents of the particular container object, if any, the bracketing ends and the contents being linearly arranged.

In an embodiment, the computer system-implemented method further comprises: (iii) providing at each of the pair of bracketing ends a GUI control configured to close the particular container object.

In an embodiment, the computer system-implemented method further comprises: (iv) providing at each closed container object a GUI control configured to open the closed container object.

In an embodiment, the computer system-implemented method further comprises visually distinguishing the plurality of hierarchical objects by hierarchical level.

In an embodiment, the computer system-implemented method further comprises generating a range of visually distinguished characteristics for each hierarchical level of the hierarchical objects in dependence upon the number of hierarchical levels.

In an embodiment, the visually distinguishing characteristic is one of color, shading, shape and size.

In an embodiment, the computer system-implemented method further comprises indicating a relative position of a container object by nesting the container object between successive pairs of bracketing ends of each higher level container object, the container object and the successive pairs of bracketing ends being linearly arranged.

In an embodiment, the computer system-implemented method further comprises linearly arranging the bracketing ends and the contents in one of a vertical orientation and a horizontal orientation.

In another aspect of the invention, there is provided a computer system having a processor and a computer readable memory, the memory containing software for displaying a plurality of hierarchical objects in a graphical user interface (GUI), the plurality of hierarchical objects including at least one container object, each container object for containing a lower level hierarchical object, the software adapting the computer system to: (a) determine whether a particular container object is open or closed; (b) if the particular container object is open, then display the particular container object as a pair of bracketing ends, the bracketing ends containing therebetween contents of the particular container object, if any, the bracketing ends and the contents being linearly arranged.

In another aspect of the invention, there is provided a computer readable medium containing computer executable code for displaying a plurality of hierarchical objects in a graphical user interface (GUI), the plurality of hierarchical objects including at least one container object, each container object for containing a lower level hierarchical object, the code adapting the computer to: (a) determine whether a particular container object is open or closed; (b) if the particular container object is open, then display the particular container object as a pair of bracketing ends, the bracketing ends containing therebetween contents of the particular container object, if any, the bracketing ends and the contents being linearly arranged.

These and other aspects of the invention will become apparent from the following more particular descriptions of exemplary embodiments of the invention.

BRIEF DESCRIPTION OF THE DRAWINGS

In the figures which illustrate exemplary embodiments of the invention.

DETAILED DESCRIPTION OF THE INVENTION

Figure 1:
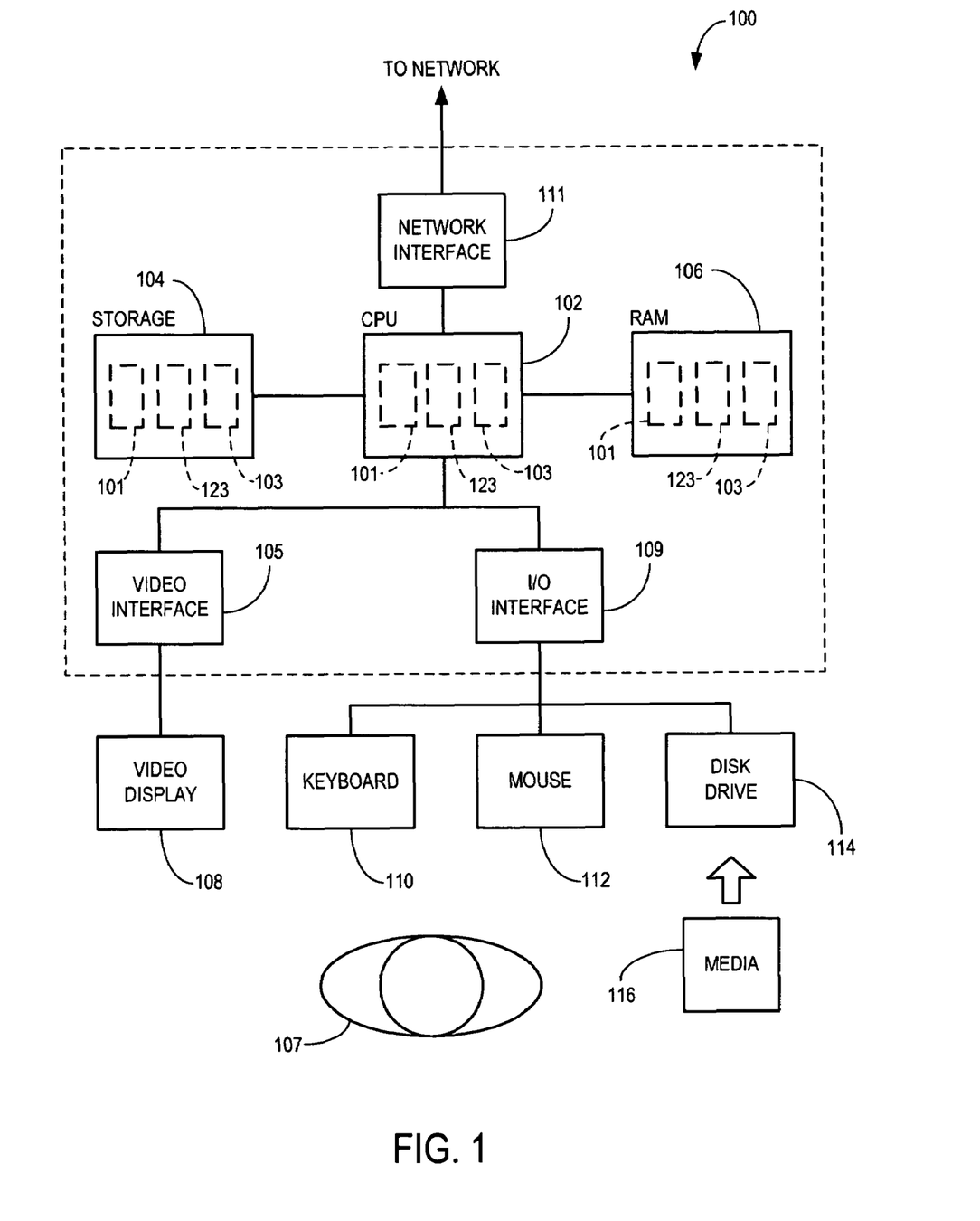
FIG. 1 is a schematic block diagram of a computer system which may provide an operating environment for practicing exemplary embodiments of the invention.

FIG. 1 shows a schematic block diagram of a computer system which may provide an operating environment for practicing exemplary embodiments of the invention. The computer system 100 may include a central processing unit ("CPU") 102 connected to a storage unit 104 and to a random access memory ("RAM") 106. The CPU 102 may process an operating system 101, GUI software code 103, and data 123 including data having a hierarchical structure. The operating system 101, data 123 and GUI software code 103 may be stored in the storage unit 104 and loaded into RAM 106, as required. A user 107 may interact with the computer system 100 using a video display 108 connected by a video interface 105, and various input/output devices such as a keyboard 110, mouse 112, and disk drive 114 connected by an I/O interface 109. In known manner, mouse 112 may be configured to control movement of a cursor in the video display 108, and to operate various GUI controls appearing in the video display 108 with a mouse button. The disk drive 114 may be configured to accept computer readable media 116. The computer system 100 may be network enabled via a network interface 111, allowing the computer system 100 to communicate with other compatible computer systems across a network (not shown).

It will be appreciated that the computer system 100 illustrated in FIG. 1 is merely illustrative, and is not meant to be limiting in terms of the type of system which may provide a suitable operating environment for practicing the present invention.

FIG. 2 is an illustrative conventional tree view 200 of a data directory represented by hierarchically arranged container objects. In this illustrative example, the container objects are folders, and are represented by folder graphic icons. In order to navigate through this conventional tree view, a user must understand and follow the convention that a lower priority folder is shown below and indented to the right of a higher priority folder. In this example, the highest level "root" folder 201 is placed at the top left of the view 200. Root folder 201 also has to its left an indicator box 201$i$ with a "−" indicating that root folder 201 is open and its contents are currently displayed. The indicator box 201$i$ may be configured to act as a GUI control for selectively closing or opening the root folder 200.

Positioned below and indented to the right of root folder 201 are the children of root folder 201, namely folders 211-219 respectively labeled "child 0.1"-"child 0.9". Folders 212, 213, 214 and 217 have, to their left, indicator boxes 212$i$, 213$i$, 214$i$, 217$i$ with a "+" indicating that theses folders have children (i.e. lower level folders) that are currently not displayed. However, as indicated by the "−" in the indicator box 219$i$ to the left of folder 219, folder 219 is currently open and its contents are on display. Each of indicator boxes 212$i$, 213$i$, 214$i$, 217I and 219$i$ may be configured to act as a GUI control for selectively opening or closing a respective folder 212, 213, 214, 217, 219.

Positioned below and indented to the right of folder 219 are folders 221-224, labeled "child 1.1"-"child 1.4" respectively. Each of folders 221-224 are children of folder 219. In this example, folder 224 is open and its contents are displayed, including folders 231 and 232 labeled "child 2.1" and "child 2.2", respectively. Folders 231 and 232 are children of folder 224. As shown, the contents of folder 231 include folders 241-244, labeled as "child 3.1"-"child 3.4" respectively, and the contents of folder 232 include folders 251 and 252, labeled as "child 3.1" and "child 3.2" respectively. Indicator boxes 222$i$, 224$i$, 231$i$ and 232$i$ indicate whether their corresponding folders 222, 224, 231, 232 are open or closed. Again, each of these indicator boxes 222$i$, 224$i$, 231$i$ and 232$i$ may be configured as GUI controls for selectively opening and closing their respective folders.

As noted earlier, connecting lines may be used as a visual aid to indicate the parent-child relationships between the various container objects (i.e. the folders in FIG. 2). In the illustrative example in FIG. 2, connecting lines (e.g. line 270) indicate that certain lower level folders (e.g. folders 251, 252) are children of certain higher level folders (e.g. folder 232). Various other connecting lines are shown.

As previously discussed, the conventional tree view of FIG. 2 has some limitations. As will now be explained, in order to address one or more of these limitations, the conventional tree view of FIG. 2 may be replaced by a corresponding linear hierarchical view, in accordance with the teachings of the present invention.

Figure 3:
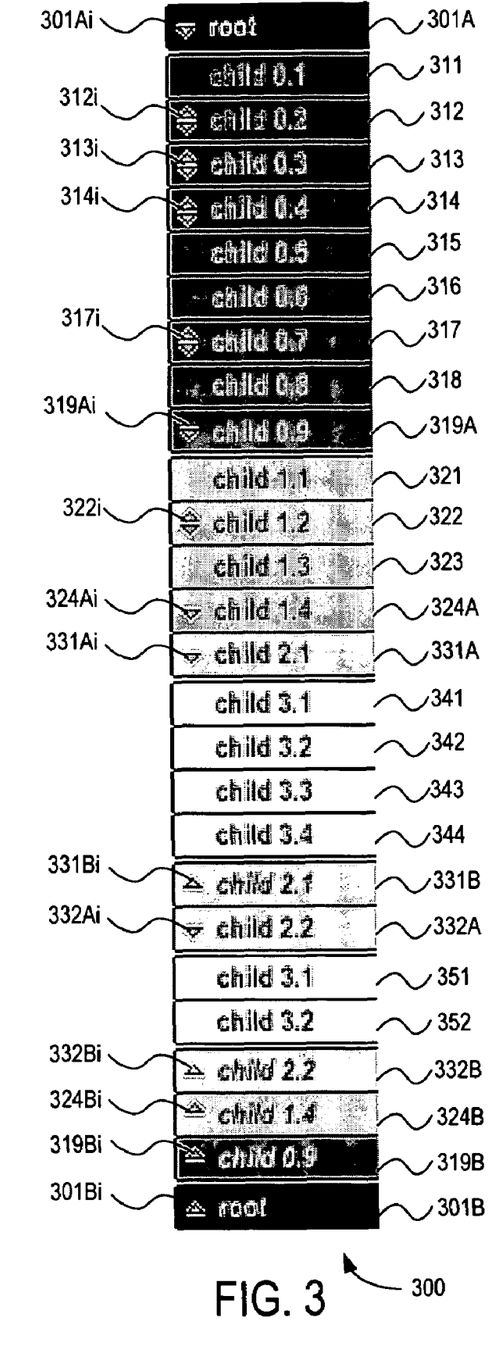
FIG. 3 is a vertically oriented linear hierarchical view in accordance with an embodiment of the invention, corresponding to the data directory of FIG. 2.

As shown in the linear hierarchical view of FIG. 3, root folder 201 of FIG. 2 has been replaced by a pair of bracketing ends, labeled as 301A and 301B respectively. Bracketing ends 301A, 301B together represent an "open" root container object 301. Placed in between bracketing ends 301A and 301B are the contents of root container object 301 (i.e. the contents of root folder 201 in FIG. 2). As will be seen, the linear hierarchical view in FIG. 3 eliminates the connecting lines (e.g. 270) shown in the conventional tree view of FIG. 2. In addition, the lateral expansion of the conventional tree view evident in FIG. 2, caused by successive indenting of lower level data container objects, is eliminated. Instead, the hierarchical information is conveyed by pairs of bracketing ends arranged in a linear, nested configuration.

In the illustrative example in FIG. 3, a downwardly pointing triangle indicator 301Ai in bracketing end 301A, and an upwardly pointing triangle indicator 301Bi in bracketing end 301B, indicate that the root container object 301 is currently open. In an embodiment, each of the triangle indicators 301Ai, 301Bi may be configured as GUI controls for collapsing root container object 301. For example, a user may operate either of the GUI controls 301Ai, 301Bi by moving a cursor over one of these GUI controls 301Ai, 301Bi and clicking or making a selection with mouse 112. Alternatively, the whole of the bracketing ends 301A and 301B may be configured to act as GUI controls so that, for example, double-clicking with mouse 112 on either bracketing end 301A or bracketing end 301B will collapse container object 301. It will be understood that various other GUI control mechanisms may be used as well.

In an embodiment, a lower bracketing end may be distinguished from an upper bracketing end by using a different font for the label (e.g. italics).

Still referring to FIG. 3, contained or bracketed between the pair of bracketing ends 301A and 301B are children 311-319 of container object 301, labeled as "child 0.1" to "child 0.9" respectively. In this illustrative example, each of children 311-319 are also container objects, corresponding to folders 211-219 of FIG. 2. As shown, each of the container objects labeled child 0.2 (312), child 0.3 (313), child 0.4 (314) and child 0.7 (317) has a "double triangle" (with one triangle pointing upwardly, and another triangle pointing downwardly) indicator 312*i*, 313*i*, 314*i*, 317*i*. Here, the double triangle indicators 312*i*, 313*i*, 314*i*, 317*i*, indicate that each of child 0.2 (312), child 0.3 (313), child 0.4 (314) and child 0.7 (317) have children that are currently not shown. This corresponds to the situation in FIG. 2 where folders 212, 213, 214 and 217 have children that are not shown.

In an embodiment, the double triangle indicators 312*i*, 313*i*, 314*i*, 317*i* may be configured as GUI controls that may be used to open the corresponding container object 312, 313, 314 and 317 (e.g. by selecting the GUI control using mouse 112). Alternatively, the whole of the container objects 312, 313, 314 and 317 may be configured as GUI controls such that, for example, double-clicking on one of the container objects with mouse 112 may open the corresponding container object.

Still referring to FIG. 3, it will be observed that child 0.9 (319) is open, and that there are a pair of bracketing ends, 319A and 319B, bracketing the contents of child 0.9 (319). As shown, child 1.1 (321), child 1.2 (322), child 1.3 (323) and child 1.4 (324) are children of child 0.9 (319). It will also be observed that each bracketing end 319A and 319B has a triangle indicator 319Ai, 319Bi, but that each triangle indicator 319Ai, 319Bi is now pointed towards the contents bracketed by the pair of bracketing ends 319A and 319B. In an embodiment, each of triangle indicators 319Ai, 319Bi may be configured as GUI controls, and either one of these GUI controls 319Ai, 319Bi may be used to close child 0.9 (319). Alternatively, the whole of the bracketing ends 319A and 319B may be configured as GUI controls to close child 0.9 (319).

Child 1.2 (322) is currently closed, and it has a double triangle indicator 322*i* indicating this closed status. Again, either indicator 322*i* or the whole of the graphical object representing child 1.2 (322) may be configured as a GUI control to open child 1.2 (322). In contrast, child 1.1 (321) and child 1.3 (323) do not have a double triangle indicator, indicating that each of child 1.1 (321) and child 1.3 (323) have no children.

Child 1.4 (324) is currently open, and its pair of bracketing ends 324A and 324B bracket the contents of child 1.4. It is seen that child 2.1 (331), and child 2.2 (332) are both children of child 1.4 (324). Child 2.1 (331) is also currently open, and its two bracketing ends 331A and 331B bracket the contents of child 2.1, namely child 3.1-child 3.4 (341-344). Child 2.2 (332) is also open, and its two bracketing ends 332A and 332B bracket the contents of child 2.2, namely child 3.1 and child 3.2 (351 and 352). Again, it will be seen that each bracketing end (e.g. 324A, 324B, 331A, 331B, 332A, 332B) contains a triangle indicator (e.g. 324Ai, 324Bi, 331Ai, 331Bi, 332Ai, 332Bi) which may be configured as a GUI control to close a corresponding container object. Alternatively, the whole of the bracketing ends (324A, 324B, 331A, 331B, 332A, 332B) may be configured as GUI controls for closing a corresponding container object.

Advantageously, by using a pair of bracketing ends (e.g. bracketing ends 331A and 331B together representing a container object 331), there is a clear appearance of containment of objects within the container object. Also, the availability of GUI controls (e.g. 331Ai, 331Bi) at each of the bracketing ends (e.g. 331A and 331B) enhances navigation by generally reducing the amount of scrolling required to open, close or otherwise select a container object. For example, if a screen view or cursor is currently closer to the bottom of a linear hierarchical view, a user may use a GUI control provided at a lower bracketing end. If a screen view or cursor is presently closer to the top of the linear hierarchical view, a user may instead use a GUI control provided at an upper bracketing end. As will be appreciated, this ability to use multiple GUI controls may reduce the amount of scrolling required to navigate the view, especially when the hierarchical view contains many levels and is extended.

In an embodiment, objects at different levels of hierarchy in the linear hierarchical view may be visually distinguished to further emphasize bracketing and containment. In particular, each pair of bracketing ends are preferably distinguished by a common visual characteristic, such as matching color, shade, shape, size, or some other readily identifiable visual feature.

In an embodiment, visually distinguishing characteristics may be dynamically assigned to each level in the linear hierarchical view. For this purpose, a suitable mathematical algorithm may be used to compute color or shade graduation values, etc. that are readily distinguishable and visually engaging. By way of example, in the illustrative example in FIG. 3, shades may be assigned automatically to each level in such a way that pairs of bracketing ends of container objects closer to the root level are darker in appearance than those at lower hierarchical levels.

In an embodiment, the amount of screen space occupied by a linear hierarchical view may be significantly reduced by only displaying the contents of the lowest level container object, with its relative position in the hierarchy indicated by nested pairs of bracketing ends. By way of example, consider the linear hierarchical view in FIG. 4, in which only the contents of child 2.1 (bracketed by bracketing ends 331A and 331B) are shown. Higher level container objects are shown by nesting pairs of corresponding bracketing ends around the bracketing ends 331A, 331B of child 2.1. In order to view the contents of a higher level container object, a user may close an appropriate container object via one of the GUI controls 319Ai, 319Bi, 324Ai, 324Bi, 331Ai, 331Bi. (Selection of GUI controls 301Ai and 301Bi would simply close the root container object 301.) For example, in order to view the contents of child 1.4 (324), the user may close child 2.1 (331A, 331B) so that both child 2.1 and child 2.2 appear. In order to view the full contents of the root container (301A, 301B), the user may close child 0.9 (319A, 319B).

Figure 4:
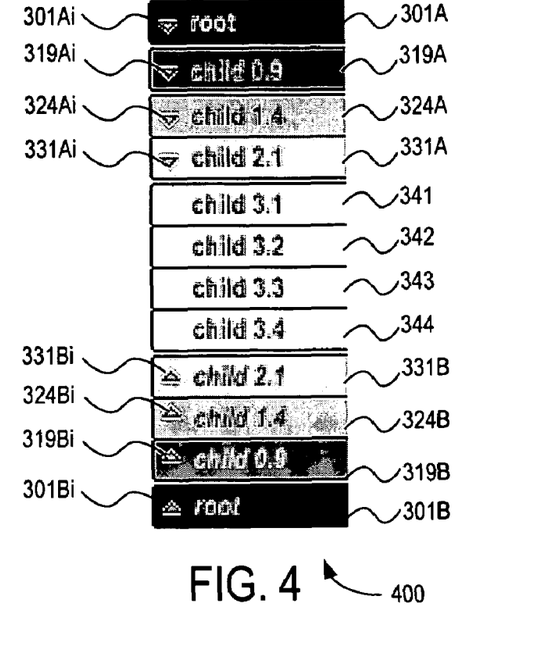
FIG. 4 is a collapsed vertically oriented linear hierarchical view in accordance with another embodiment of the invention, also corresponding to the directory of FIG. 2.

In an embodiment, a toggle key or GUI control may be used to alternate between the linear hierarchical view of FIG. 3 and the collapsed linear hierarchical view of FIG. 4. The toggle key may comprise, for example, a combination of keystrokes on keyboard 110, a user selectable GUI control appearing on a screen (e.g. video display 108), or some other suitable GUI control provided via the GUI interface.

The linear hierarchical view in accordance with the present invention may be oriented horizontally rather than vertically. The choice of whether to display the linear hierarchical view horizontally or vertically depends on the nature of the hierarchical data being displayed.

Figure 5:
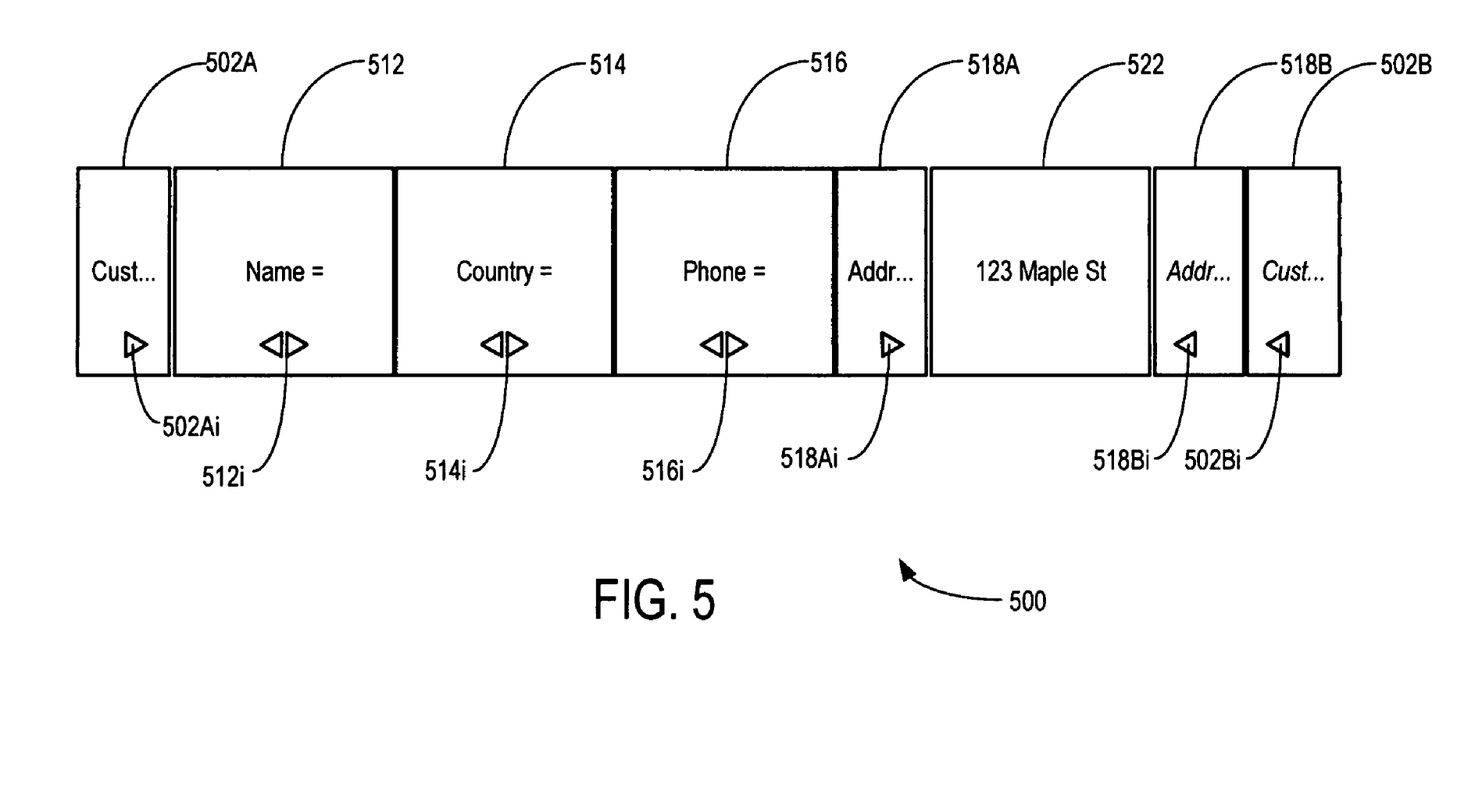
FIG. 5 is an illustrative example of a horizontal linear hierarchical view, in accordance with another embodiment of the invention.

For example, consider the horizontally oriented linear hierarchical view as illustrated in FIG. 5. Here, the linear hierarchical view relates to information about a particular customer, as indicated by the "customer" label on bracketing ends 502A, 502B of the highest level container object 502. As shown, bracketing ends 502A, 502B bracket therebetween the contents of container object 502. In this illustrative example, the contents of container object 502 include a "name" container object 512, a "country" container object 514, a "phone" container object 516, and "address" container object 518. Address container object 518 is currently open, and represented by a pair of bracketing ends 518A, 518B.

As shown, the container objects 512, 514, 516 each have double triangle indicators 512i, 514i, 516i indicating that these container objects 512, 514, 516 may be opened to display their contents. Each bracketing end 518A, 518B of container object 518 has a triangle indicator 518Ai, 518Bi indicating that container object 518 is open and may be closed.

As with the earlier examples discussed above (with reference to FIG. 3 and FIG. 4), these indicators 512i, 514i, 516i, 518Ai, 518Bi may be configured as GUI controls to open or close corresponding container objects. However, as shown, the container objects are now opened and closed in a horizontal orientation.

Also, as described above, open container objects may be dynamically collapsed or closed such that only the contents of a currently selected container object are displayed.

Figure 6:
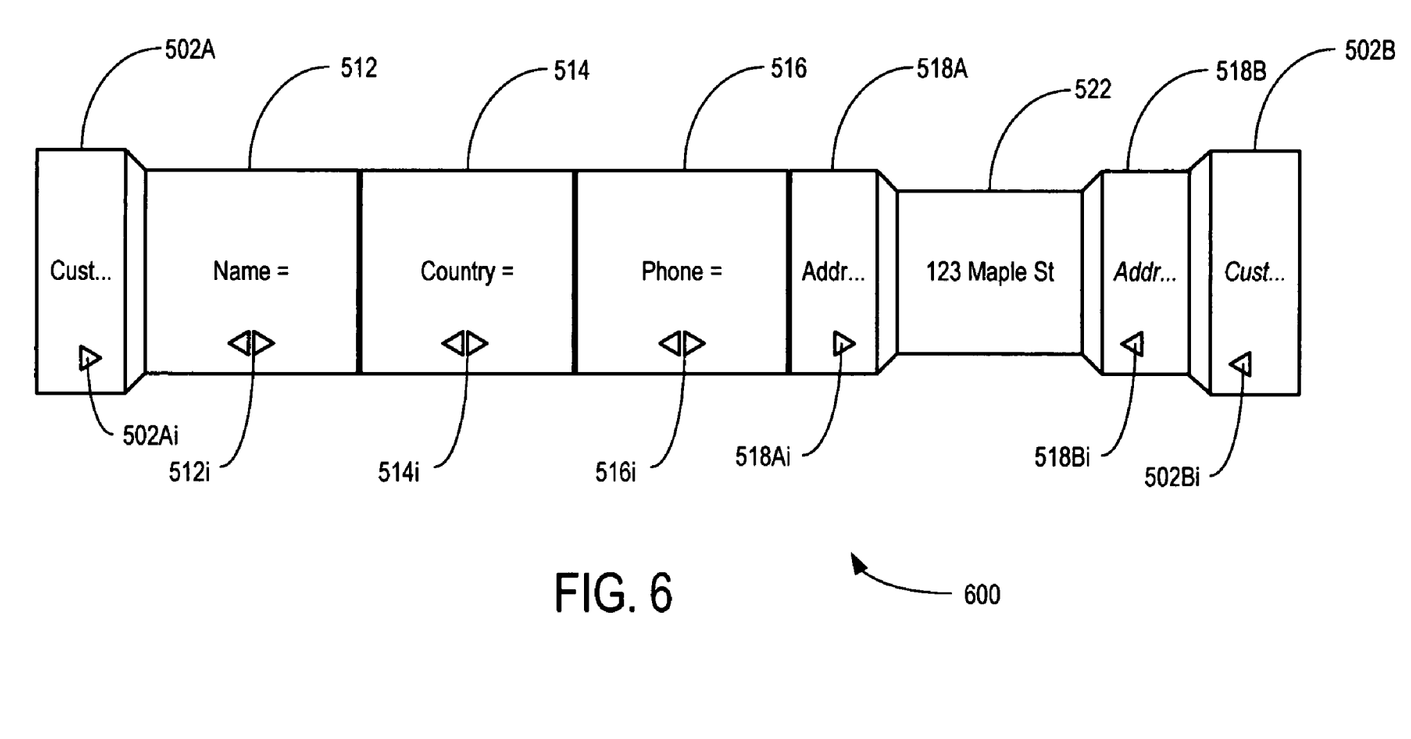
FIG. 6 is another illustrative example of a horizontal linear hierarchical view, with levels visually distinguished in accordance with another embodiment of the invention.

In another embodiment, a visually distinguishing feature that may be used to distinguish different levels of hierarchy may comprise modifying the shape or size of the container objects. By way of example, as illustrated in FIG. 6, lower level objects in the linear hierarchical view may be given the appearance of being placed somewhat "deeper" in the view by being given a narrower width. The effect may be further enhanced by modifying each bracketing end to give the appearance of depth. This depth effect may also be combined with other visually distinguishing features for each hierarchical level, such as different colors or shades, as previously illustrated in FIG. 3 and FIG. 4. It will be appreciated that this is but one example of how the linear hierarchical view may be modified, and that numerous other ways of distinguishing the hierarchical levels may be used.

Advantageously, the linear hierarchical view in accordance with the present invention can display hierarchical data both horizontally and vertically, providing more flexibility to an application developer to decide how data should be presented. Also, there is better use of horizontal and vertical space since the data can be displayed all in one column or row.

While various illustrative embodiments of the invention have been described above, it will be appreciated by those skilled in the art that variations and modifications may be made. Thus, the scope of the invention is defined by the following claims.

What is claimed is:

1. A computer system-implemented method of displaying a plurality of hierarchical objects in a graphical user interface (GUI), said plurality of hierarchical objects including at least one container object, each container object for containing a lower level hierarchical object, said computer system-implemented method comprising:
   (i) determining whether a particular container object is open or closed;
   (ii) if said particular container object is open, then displaying said particular container object as a pair of bracketing ends, said bracketing ends containing therebetween contents of said particular container object, if any, said bracketing ends and said contents being linearly arranged
   (iii) visually distinguishing said plurality of hierarchical objects by hierarchical level.

2. The computer system-implemented method of claim 1, further comprising:
   (iii) providing at each of said pair of bracketing ends a GUI control configured to close said particular container object.

3. The computer system-implemented method of claim 2, further comprising:
   (iv) providing at each closed container object a GUI control configured to open said closed container object.

4. The computer system-implemented method of claim 1, further comprising generating a range of visually distinguished characteristics for each hierarchical level of said hierarchical objects in dependence upon the number of hierarchical levels.

5. The computer system-implemented method of claim 4, wherein said visually distinguishing characteristic is one of color, shading, shape and size.

6. The computer system-implemented method of claim 1, further comprising indicating a relative position of a container object by nesting said container object between successive pairs of bracketing ends of each higher level container object, said container object and said successive pairs of bracketing ends being linearly arranged.

7. The computer system-implemented method of claim 1, further comprising linearly arranging said bracketing ends and said contents in one of a vertical orientation and a horizontal orientation.

8. A computer system having a processor and a computer readable memory, said memory containing software for displaying a plurality of hierarchical objects in a graphical user interface (GUI), said plurality of hierarchical objects including at least one container object, each container object for containing a lower level hierarchical object, said software adapting said computer system to:
   (a) determine whether a particular container object is open or closed;
   (b) if said particular container object is open, then display said particular container object as a pair of bracketing ends, said bracketing ends containing therebetween contents of said particular container object, if any, said bracketing ends and said contents being linearly arranged
   (c) visually distinguishing said plurality of hierarchical objects by hierarchical level.

9. The computer system of claim 8, wherein said software further adapts said computer system to:

(c) provide at each of said pair of bracketing ends a GUI control configured to close said particular container object.

10. The computer system of claim 9, wherein said software further adapts said computer system to:
(d) provide at each closed container object a GUI control configured to open said closed container object.

11. The computer system of claim 8, wherein said software further adapts said computer system to generate a range of visually distinguished characteristics for each hierarchical level of said hierarchical objects in dependence upon the number of hierarchical levels.

12. The computer system of claim 11, wherein said visually distinguishing characteristic is one of color, shading, shape and size.

13. The computer system of claim 8, wherein said software further adapts said computer system to indicate a relative position of a container object by nesting said container object between successive pairs of bracketing ends of each higher level container object, said container object and said successive pairs of bracketing ends being linearly arranged.

14. The computer system of claim 8, wherein said software further adapts said computer system to linearly arrange said bracketing ends and said contents in one of a vertical orientation and a horizontal orientation.

15. A computer readable medium containing computer executable code for displaying a plurality of hierarchical objects in a graphical user interface (GUI), said plurality of hierarchical objects including at least one container object, each container object for containing a lower level hierarchical object, said code adapting said computer to:
(a) determine whether a particular container object is open or closed;
(b) if said particular container object is open, then display said particular container object as a pair of bracketing ends, said bracketing ends containing therebetween contents of said particular container object, if any, said bracketing ends and said contents being linearly arranged
(c) visually distinguishing said plurality of hierarchical objects by hierarchical level.

16. The computer readable medium of claim 15, wherein said code further adapts said computer to:
(c) provide at each of said pair of bracketing ends a GUI control configured to close said particular container object.

17. The computer readable medium of claim 16, wherein said code further adapts said computer to:
(d) provide at each closed container object a GUI control configured to open said closed container object.

18. The computer readable medium of claim 15, wherein said code further adapts said computer to generate a range of visually distinguished characteristics for each hierarchical level of said hierarchical objects in dependence upon the number of hierarchical levels.

19. The computer readable medium of claim 18, wherein said visually distinguishing characteristic is one of color, shading, shape and size.

20. The computer readable medium of claim 15, wherein said code further adapts said computer to indicate a relative position of a container object by nesting said container object between successive pairs of bracketing ends of each higher level container object, said container object and said successive pairs of bracketing ends being linearly arranged.

21. The computer readable medium of claim 15, wherein said code further adapts said computer to linearly arrange said bracketing ends and said contents in one of a vertical orientation and a horizontal orientation.

* * * * *